United States Patent [19]

Stibila

[11] Patent Number: 4,862,495
[45] Date of Patent: Aug. 29, 1989

[54] TELECOMMUNICATIONS SUBSCRIBER LINE INTERFACE CIRCUIT AND PARTY IDENTIFICATION FACILITY

[75] Inventor: Michael E. Stibila, Winter Park, Fla.

[73] Assignee: GEC Plessey Telecommunications, LTD., Coventry, United Kingdom

[21] Appl. No.: 184,860

[22] Filed: Apr. 22, 1988

[51] Int. Cl.$^4$ ............................................. H04M 15/36
[52] U.S. Cl. .................................... 379/183; 379/377; 379/399
[58] Field of Search .................... 340/825.38, 825.39, 340/825.40, 825.41, 825.42; 379/183, 377, 380, 382, 386, 400, 399, 413, 324, 187, 286, 177

[56] References Cited

U.S. PATENT DOCUMENTS

| | | | |
|---|---|---|---|
| 3,939,308 | 2/1976 | Shaver et al. ........................ | 379/183 |
| 4,056,690 | 11/1977 | Brolin et al. ...................... | 379/183 X |
| 4,371,755 | 2/1983 | Brolin .............................. | 379/183 X |
| 4,476,350 | 10/1984 | Aull et al. ........................ | 379/413 X |

OTHER PUBLICATIONS

"Modern Electronic Devices Circuit Design and Application", M. Rosenstein et al., Reston Publishing Comp., Reston, Virginia, pp. 251-253, 1985.

Primary Examiner—Jin F. Ng
Assistant Examiner—Randall S. Vaas
Attorney, Agent, or Firm—Michael F. Oglo; Julian C. Renfro

[57] ABSTRACT

The invention provides a tip party identification facility in association with a subscriber line interface circuit. The tip party identification facility takes advantage of a shutdown feature and the output of a common mode error amplifier of the subscriber line interface circuit. The use of this facility enables the central office to determine whether the tip party or ring party is off-hook for billing purposes.

1 Claim, 1 Drawing Sheet ured States are required to
TELECOMMUNICATIONS SUBSCRIBER LINE INTERFACE CIRCUIT AND PARTY IDENTIFICATION FACILITY

FIELD OF INVENTION

The invention relates to the field of telecommunications, and in particular a subscriber line interface circuit having a tip party identification facility.

DESCRIPTION OF THE PRIOR ART

A subscriber line interface circuit is described in a publication entitled "A High Voltage IC for a Transformerless Trunk and Subscriber Line Interface", by D. W. Aull, D. A. Spires, P. C. Davis, and S. F. Moyer, IEEE Jornal of Solid-State Circuits, Vol SC-16, No 4, August 1981.

Central offices in the United States are required to interface "party lines" to the communications network. Party lines are multiple subscriber phones connected to the same pair of wires or telephone line. The central office must be able to determine which party is using the line so that the proper subscriber can be billed for any toll or long distance calls made. The Tip Party Identification circuit indicates when the tip party is off-hook by detecting a tip to ground resistance less than a predetermined value. If the tip to ground resistance is much greater than the predetermined value than it is assummed that the ring party is off-hook.

Presently there are many methods for providing party identification, but the majority of circuits connect the two wires (tip and ring) of the telephone line together through a resistor to the negative central office battery. The voltage present across the resistor is sensed, filtered and compared to a reference to determine if there is significant DC current flow to ground. Significant DC current indicates the tip party is off-hook, otherwise, the ring party is off-hook. The party identification function is not an integral part of the line circuit and in most cases it must be shared over many lines to be cost effective. Sharing the identification circuitry requires a metallic connection between circuits and relays to connect the identification circuit to individual lines. This approach is an inefficient and costly method of implementing this feature.

SUMMARY OF THE INVENTION

The invention provides a tip party identification facility in association with a subscriber line interface circuit. The tip party identification facility takes advantage of the shut-down feature and the output of the common mode error amplifier, of the subscriber line interface circuit. By the use of this facility, the central office can determine whether the tip party or the ring party is off-hook for billing purposes.

The party identification eliminates the need for a tip and ring access network for a shared party identification circuit. The party identification circuiting is cost effectively incorporated into the subscriber line interface circuit IC by taking maximum advantage of existing circuitry and signals.

STATEMENT OF THE OBJECTS OF INVENTION

It is an object of this invention to provide an improved subscriber line interface circuit and party identification facility.

It is a further object of this invention to provide a subscriber line interface circuit and party identification facility in a more cost effective manner.

These and other objects of the invention will become more readily apparent from the ensuing specification when taken together with the drawing.

DESCRIPTION OF THE PREFERRED EMBODIMENT

Figure 1:
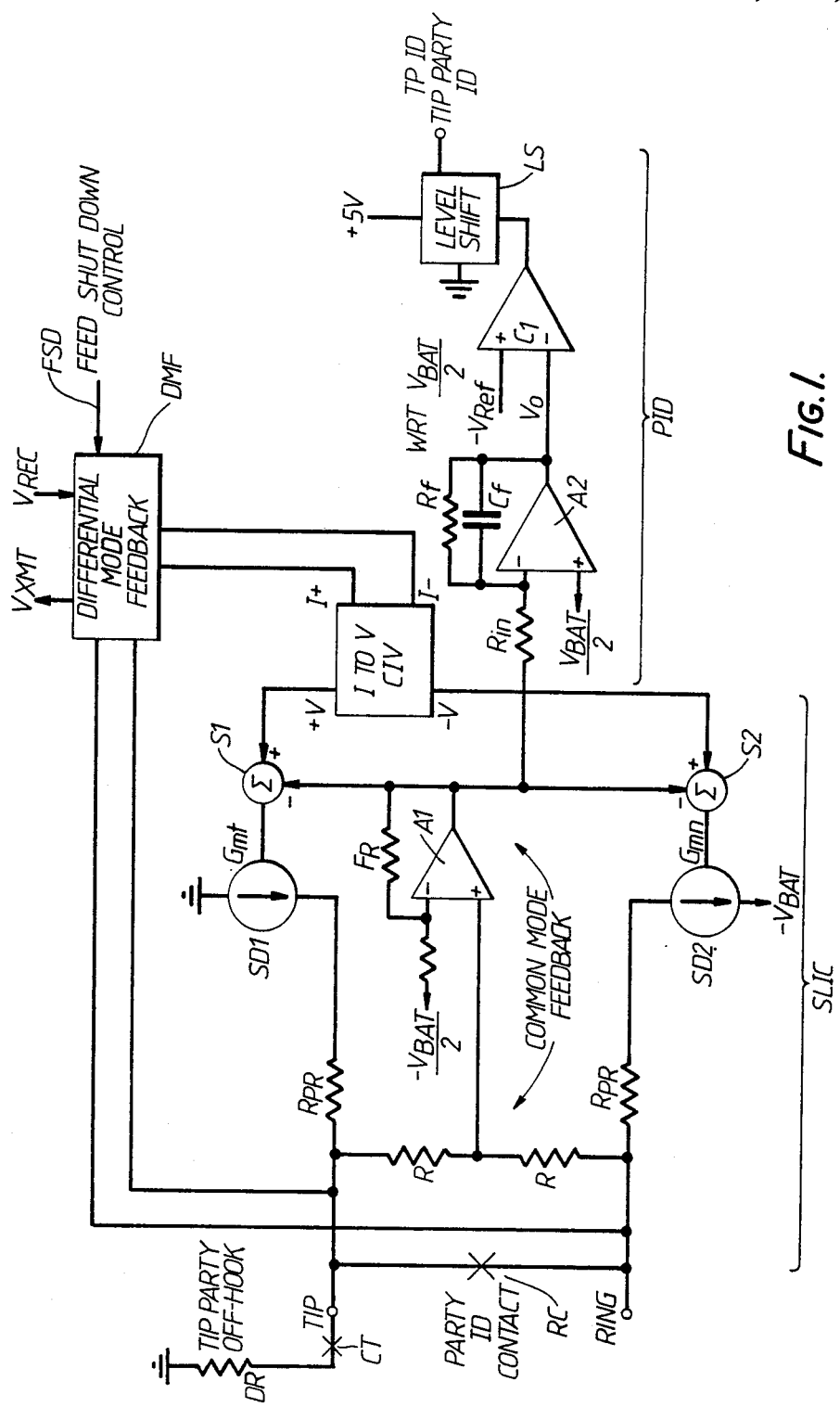
FIG. 1 illustrates the circuitry of the subscriber line interface circuit and party identification facility according to the present invention.

Referring to FIG. 1, a circuit diagram according to the present invention will now be described. The circuit diagram depicts two circuits, a solid state subscriber line interface circuit SLIC, and a party identification circuit PID.

The subscriber line interface circuit, SLIC includes a differential mode feedback circuit DMF having a feed shut-down control input FSD, a voltage receive input $V_{REC}$ and a voltage transmit output $V_{XMT}$. A common mode error amplifier A1, is provided with a feedback resistor FR. The amplifier A1 has one input connected to a voltage source $-V_{BAT/2}$, and another input connected to the junction of resistors R, R which are in series accross the RING and TIP lines.

The tip line is connected by way of a contact CT to earth by way of a tip party off-hook detection resistor DR.

The RING and TIP lines are also connected to the differential mode feedback circuit DMF, which in accordance with the feed shut-down control input FSD, generates output currents which are converted into voltages by converter CIV. The respective voltages generated by the converter CIV are summed with the output of the amplifier A1 by respective summators S1, S2 and are applied by way of devices SD1, SD2 to the TIP and RING lines respectively.

When the subscriber line interface circuit is in the feed shut down mode, i.e., zero volts differential, the TIP and RING lines are bridged by a party identification relay contact RC, which short-circuits resistor R—R. The output of the amplifier A1 is proportional to the common mode current flowing in the TIP and RING lines. The output of the amplifier A1 has a direct current component and an alternating current component. The direct current level is an indication of the magnitude of the TIP to ground resistance.

The party identification circuit PID comprises an amplifier A2, having a first input connect by way of input resistor $R_{IN}$ to the output of the amplifier A1. A second input is connected to a potential $V_{BAT/2}$. The amplifier A2, amplifies the direct current component and attenuates the alternating current component. The resulting output voltage Vo is compared with a predetermined reference voltage $-V_{Ref}$ by a comparator C1, to determine if the TIP party is off-hook. The output of the comparator C1 is level shifted by device LS so that it can be easily interfaced with 0–5 volt logic circuitry, and provides a TIP party identification output, TPID.

The foregoing description taken together with the appended claims constitute a disclosure such as to enable a person skilled in the art of telecommunications and having the benefit of the teachings contained therein to make and use the invention. Further, the structure herein described meets the objects of invention and generally constitute a meritorious advance in the art unobvious to such a person not having the benefit of these teachings.

Obviously, modifications and variations of the present invention are possible in the light of the above teachings, and it is therefore understood that within the scope of the disclosed inventive concept, the invention may be practised otherwise than as specifically described.

I claim:

1. A telecommunications central office including a telecommunications subscriber line interface circuit and party identification facility, comprising:
   a differential mode feedback circuit having a feed shut down control input, and arranged to monitor a ring line and a tip line, and generate a current output which is applied to a converter to generate a voltage output,
   a first amplifier arranged to monitor the ring and tip lines and generate an output which is proportional to a common-mode current flowing in the ring and tip lines when the subscriber line interface circuit is in a feed shut down mode as dictated by the output from differential mode feedback circuit,
   a second amplifier arranged to receive the output from the first amplifier and amplify a direct current component of the output from the first amplifier and attenuate the alternating current component of the output from the first amplifier, and,
   a comparator arranged to receive the amplified direct current component and compare it witl a reference voltage to determine if the tip party is off-hook.

* * * * *